Aug. 18, 1936.  H. F. YERGES  2,051,282
COAL BURNING STOKER
Filed May 18, 1934  2 Sheets-Sheet 1

Inventor
Howard F. Yerges
By W. S. McDowell
Attorney

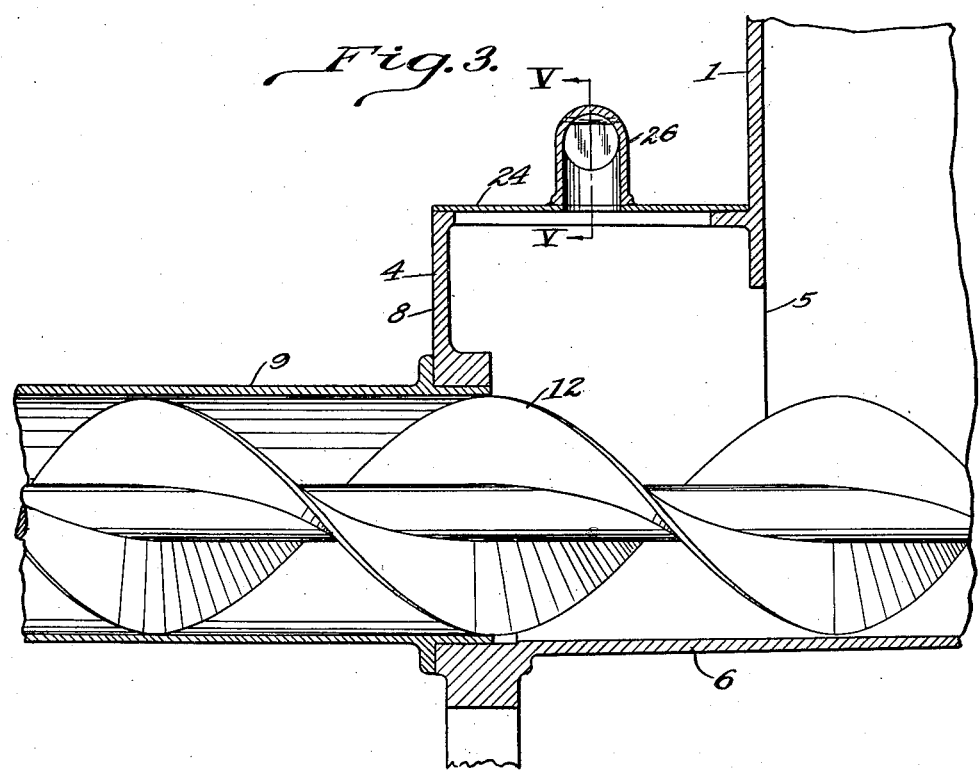
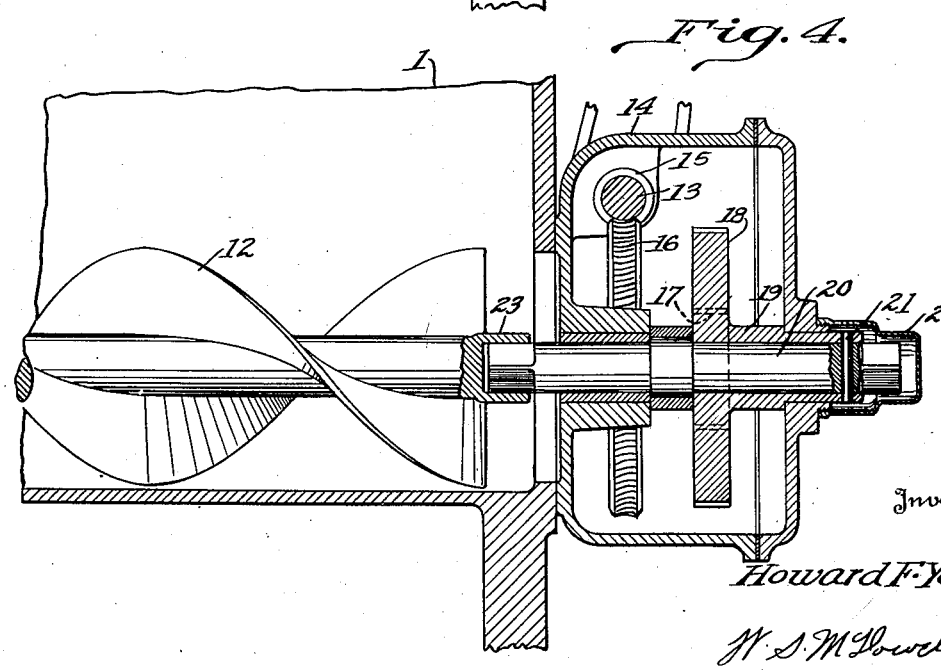

Patented Aug. 18, 1936

2,051,282

UNITED STATES PATENT OFFICE 2,051,282

COAL BURNING STOKER

Howard F. Yerges, Columbus, Ohio, assignor to Columbus Metal Products Inc., Columbus, Ohio, a corporation of Ohio Application May 18, 1934, Serial No. 726,242

2 Claims. (Cl. 110—45)

This invention relates to improvements in domestic stokers of the type utilizing a storage hopper and a motor driven worm conveyor for advancing coal through a feed pipe communicating with the bottom of the hopper and leading to a combustion retort arranged in the lower part of an associated furnace. In such apparatus, the worm conveyor possesses approximately the same diameter as the internal diameter of the feed pipe. In the operation of such apparatus, it sometimes happens that pieces of metal or other foreign hard substances become mixed with the coal introduced into the hopper. When such pieces of metal reach the outlet of the hopper at the entrance end of the coal feeding pipe, they frequently become wedged between the blade of the worm conveyor and the wall defining the outlet of the hopper or the entrance of the feed pipe. This results in arresting rotation of the worm conveyor and provision is usually made in the power operated drive mechanism for the conveyor to release the same from its driving mechanism by means of a breakable key or pin, which shears when the worm conveyor drive is unduly loaded. It then becomes necessary to remove the obstructing foreign particle from its wedged position in the bottom of the hopper. Heretofore this has necessitated quite often the removal of the coal contained within the hopper in order to obtain access to the obstructing particle of matter, which has involved a disagreeable, laborious and time consuming operation.

It is, therefore, an object of the present invention to provide in connection with the bottom of the hopper of a coal stoker between the outlet of the hopper and the entrance end of the feed pipe a relatively shallow, longitudinally offset trap or chamber provided with a removable lid or closure, the trap constituting, in effect, a shallow lateral offset in connection with the hopper base or bowl and in such form that in the event there is any jambing of the conveyor worm by metallic objects or other foreign particles, the jambing condition will occur within the confines of the trap. Since the trap is of relatively shallow construction and is provided with a removable cover, it becomes a simple matter to remove the cover to obtain convenient access to the lodged particle of foreign matter which is causing the obstructing condition and interfering with the rotation of the conveyor worm, enabling the obstruction to be readily removed, without regard to the quantity of coal contained within the hopper, so that the normal operation of the apparatus may proceed with the least possible delay and inconvenience.

It sometimes occurs in the operation of domestic stokers that an under-supply of coal will be fed to the combustion retort, causing the creation of smoke which finds an easier course of vent or escape in a rearward direction through the feed pipe, and thence through the hopper and escapes to the atmosphere of the cellar or room in which the stoker is positioned. To overcome this condition, the present invention provides a conduit which communicates with the upper end of the hopper trap, the said conduit leading from the hopper trap to the air intake of a motor driven fan which is employed in delivering proper volumes of air to the combustion retort of the stoker, whereby through this arrangement, any smoke which traverses the feed pipe in a direction opposed to the passage of coal therethrough, will be collected within the confines of the trap and through the conduit associated therewith transferred to the blower or fan of the stoker and returned to the combustion retort for escape through the normal smoke outlet of the furnace. The present invention thus overcomes objectionable room smoke which accompanies the operation of many types of domestic stokers.

For a further understanding of the invention, reference is to be had to the following description and the accompanying drawings, wherein:

Fig. 4 is a similar view disclosing the drive mechanism for the conveyor worm;

Fig. 5 is a detail longitudinal sectional view taken on the plane indicated by the line V—V of Fig. 3 and disclosing the air admitting valve of the conduit employed for collecting smoke from the trap to the air intake of the stoker fan.

Figure 1:
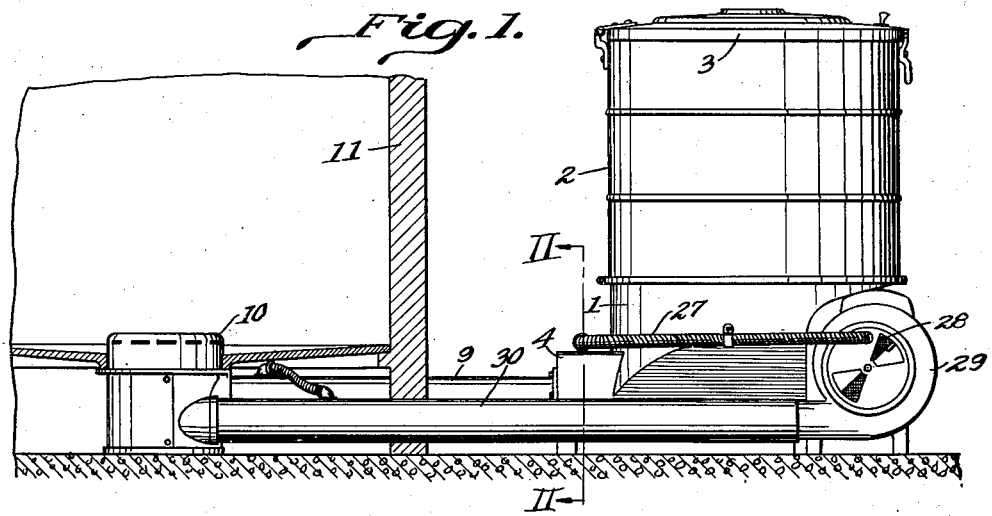
Fig. 1 is a view in side elevation of a domestic stoker constructed to embody the features of the present invention.
Figure 2:
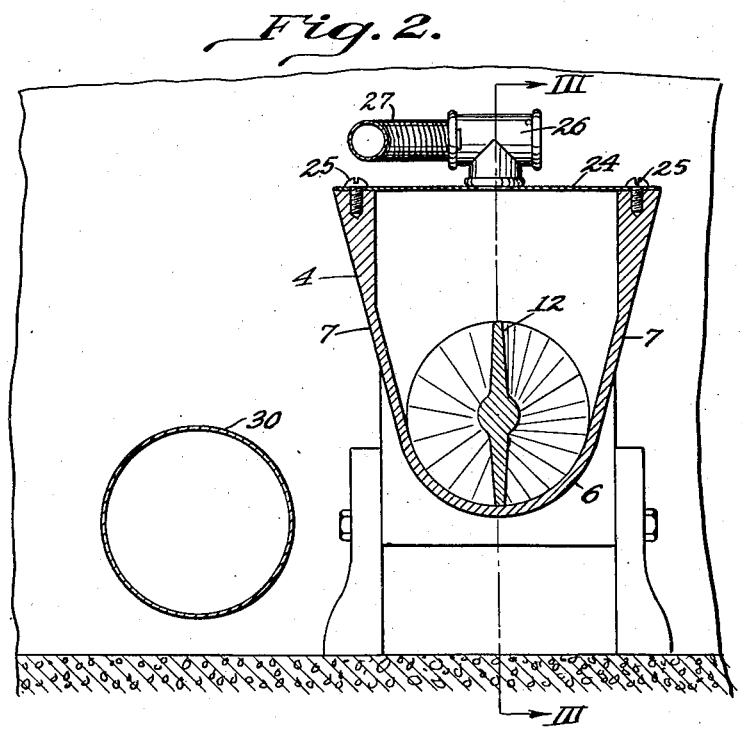
Fig. 2 is a transverse vertical sectional view taken through the stoker on the plane indicated by the line II—II of Fig. 1, and disclosing more particularly the construction of the foreign object and smoke trap which constitutes the salient feature of the present invention.
Figure 3:
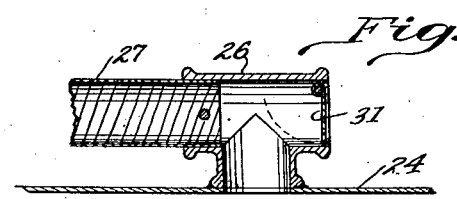
Fig. 3 is an enlarged longitudinal sectional view taken through the outlet of the stoker hopper, the associated trap and the entrance end of the coal feed pipe, the conveyor worm being shown in elevation, this section being taken on the line III—III of Fig. 2.

Referring more particularly to the drawings, the numeral 1 designates the cast metal base or bowl of the stoker upon which is mounted a coal receiving hopper 2 of any desired configuration. The top of the hopper may be provided with the usual hinge mounted lid 3. In this instance, the rear longitudinal side of the bowl 1 is formed with an extension or continuation constituting a trap 4. This trap is slightly higher than the coal outlet 5 of the hopper bowl 1 and, as shown in Fig. 2, includes a rounded bottom 6, upwardly and outwardly flaring walls 7—7 and an integral vertically disposed rear wall 8. This rear wall is provided with an opening in which is received the forward end of a coal feeding pipe 9, the latter extending to a combustion retort 10 of standard construction which is arranged in the bottom of a furnace 11.

Extending longitudinally through the bottom of the hopper 2, the trap 4 and the feed pipe 9 is a conveyor worm 12. This worm, as shown in Fig. 4, is driven by means of a motor shaft 13 arranged in a transmission casing 14. The shaft 13 carries a worm 15 which meshes with a worm gear 16 fixed on a counter-shaft, not shown. The latter is provided with a gear 17, shown in dotted lines in Fig. 4, which meshes with an enlarged spur gear 18 which is mounted on a quill or sleeve 19, the latter being connected with a longitudinal shaft 20 mounted for rotation within suitable bearings provided in the transmission case 14 by means of a breakable or frangible pin 21, which is protected by means of a removable thimble 22 carried on the outer side of the casing 14. The inner end of the shaft 20 is preferably squared and received within a socket 23 formed in the forward end of the conveyor worm 12.

By virtue of this construction, it will be seen that in the event metallic particles should become mixed with the coal introduced into the hopper, the same will be conveyed by the operation of the worm 12 into the trap 4. In the event these foreign particles of matter do not enter the feed pipe 9 without interfering with the rotation of the conveyor worm, it is quite likely that said foreign particles will become wedged between the outer edges of the conveyor worm and the entrance end of the feed pipe 9. When this jambing condition occurs, the rotation of the conveyor worm is arrested and relief is provided by the frangible pin 21 which shears so that the conveyor drive mechanism will be released and strain removed from the same. Before the apparatus can then be restored to normal operation, it is necessary to remove the obstructing foreign particle of matter which is interfering with the rotation of the worm. Heretofore, it has been necessary in order to do this for the operator to remove coal from the hopper to reach the obstructing particle of matter. By the present invention, however, greater convenience is to be obtained through the employment of the relatively shallow trap 4 arranged at one side of the hopper. This trap includes a readily removable cover plate 24 which is normally held in place by means of the removable screws 25 disclosed in Fig. 2. Since this trap possesses a depth of but a few inches, it is a very simple matter for an attendant to remove the cover and reach the obstructing particles of matter to effect their removal. When this is done, the cover plate is restored to its normal position, the frangible pin 21 replaced and the apparatus is then in condition for normal operation.

Not only does the trap 4 provide for the convenient removal of solid particles of foreign matter, but it also serves in the capacity of preventing feed pipe return smoke from escaping into the room in which the apparatus is located. I accomplish this by providing the cover plate 24 with a T fitting 26. To one branch of this fitting there is secured a flexible or other form of conduit 27, which extends to the air intake 28 of the customary fan or blower 29 which is commonly used in domestic stoker apparatus for supplying air under pressure, by way of a pipe 30, to the combustion vessel 10. The other branch of the fitting 26 includes a gravity operated butterfly valve 31, which normally occupies a position closing the fitting to prevent escape of coal dust to outside points. However, in the operation of the apparatus, in the event smoke, or similar volatile particles of matter, should find its way back through a feed pipe 9 in counter-flow relationship to the advance of coal therethrough, such smoke will be caught in the trap 4. Since this return of smoke toward the hopper usually occurs when the fan is in operation, it will be seen that air will be drawn into the fitting 26 by way of the valve 31 and thence through the conduit 27. This passage of air through the fitting and associated conduit creates a partial vacuum or suction within the trap so that smoke which may accumulate within or be delivered to said trap will be withdrawn therefrom and transferred to the fan or blower 29, and thence returned by way of the air supply pipe 30 to the combustion retort for normal outlet from the furnace 11.

The apparatus is essentially simple in construction, devoid of complication and will require little or no manual attention. It will be seen that the construction and arrangement of the trap 4 is such that it will provide for (a) the convenient removal of obstructing matter from the blades of the conveyor worm; (b) the convenient removal of returned smoke from the feed pipe and the positive prevention of such smoke from reaching the atmosphere outside of the furnace; and (c) the provision of means for insuring a full and proper delivery of coal to the conveyor worm so that substantially the full carrying capacity of the worm and its associated feed pipe 9 may be utilized in delivering requisite quantities of fuel to the combustion vessel in meeting its fuel demands. The inclusion of the valve 31 provides for a normal draft through the conduit 27 so that but a very mild suction influence will be set up within the trap. In other words, the degree of suction will be that required to positively remove smoke from the top of the trap, but insufficient to cause any appreciable advance of smoke or other furnace gases in an outward direction through the feed pipe 9.

While I have described what I consider to be a preferred embodiment of my present invention, yet it will be understood by those skilled in the art that the construction illustrated and described may be materially modified without departing from the real spirit and scope of the invention as the latter has been defined in the following claims.

What is claimed is:

1. In house heating stoker apparatus of the type having a retort adapted to be positioned in an associated furnace, a substantially upright coal receiving hopper including a base, a trap extension projecting rearwardly from said base and possessing a depth materially less than that of said hopper, a coal transmitting pipe leading from one end of said extension to the furnace retort, a rotatable conveyor screw extending through the base of said hopper, trap extension and pipe, a movable closure plate carried by said extension and providing access to the interior of the extension, a motor driven fan for supplying a forced draft of air to said retort, a valve fitting carried by said closure plate, said fitting communicating with the interior of said trap and the atmosphere, a flap valve pivoted in the opening of said fitting communicating with the atmosphere, and a conduit leading from said fitting to the air inlet of said fan, the flow of air through said fitting and conduit serving to produce a mild suction within said trap to withdraw volatiles therefrom in the form of gases or smoke.

2. In house heating stoker apparatus having a retort and blower, an upright coal receiving hopper having a base, a casing formed with and projecting rearwardly from said base, a feed pipe leading from said casing to said retort, a rotatable conveyor screw extending through the base of said hopper, casing and feed pipe, a removable cover plate closing the top of said casing, a hollow fitting carried by said plate in communication with the interior of said casing and the atmosphere, conduit means connecting said fitting with the inlet of said blower, and a gravity controlled shutter arranged in said fitting between the opening to said casing and the opening to the atmosphere.

HOWARD F. YERGES.